(12) United States Patent
Ibi et al.

(10) Patent No.: US 8,929,725 B2
(45) Date of Patent: *Jan. 6, 2015

(54) IMAGE CAPTURING APPARATUS AND CONTROL METHOD THEREOF

(71) Applicant: Canon Kabushiki Kaisha, Tokyo (JP)

(72) Inventors: Toshio Ibi, Tokyo (JP); Teruhiko Ueyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,902

(22) Filed: Jan. 29, 2014

(65) Prior Publication Data

US 2014/0186016 A1 Jul. 3, 2014

Related U.S. Application Data

(63) Continuation of application No. 13/194,304, filed on Jul. 29, 2011, now Pat. No. 8,666,239, which is a continuation of application No. PCT/JP2010/000825, filed on Feb. 10, 2010.

(30) Foreign Application Priority Data

Feb. 12, 2009 (JP) ................................. 2009-030469
Feb. 17, 2009 (JP) ................................. 2009-034027
Feb. 9, 2010 (JP) ................................. 2010-027001

(51) Int. Cl.
*G03B 17/00* (2006.01)
*H04N 5/228* (2006.01)
*G03B 17/18* (2006.01)
*H04N 5/232* (2006.01)
*H04N 5/44* (2011.01)

(52) U.S. Cl.
CPC ............... *G03B 17/00* (2013.01); *G03B 17/18* (2013.01); *H04N 5/232* (2013.01); *H04N 5/23251* (2013.01); *H04N 2005/4428* (2013.01)
USPC ......................................... 396/53; 348/208.16

(58) Field of Classification Search
CPC ..................... G03B 2217/005; H04N 5/23248
USPC .................. 396/50, 52, 53; 348/208.1, 208.2, 348/208.12, 208.16
See application file for complete search history.

(56) References Cited

U.S. PATENT DOCUMENTS

2008/0145041 A1* 6/2008 Enomoto ........................ 396/53

FOREIGN PATENT DOCUMENTS

JP 2009-302808 A 12/2009

* cited by examiner

*Primary Examiner* — Clayton E LaBalle
*Assistant Examiner* — Minh Phan
(74) *Attorney, Agent, or Firm* — Cowan, Liebowitz & Latman, P.C.

(57) ABSTRACT

In an image capturing apparatus that allows input of instructions to the image capturing apparatus by shaking the apparatus, without using an operation unit, it is determined whether or not the image capturing apparatus is shaking. Then, in a case in which it is determined that the image capturing apparatus is shaking, at least some of the operations of the operation unit are invalidated.

13 Claims, 9 Drawing Sheets

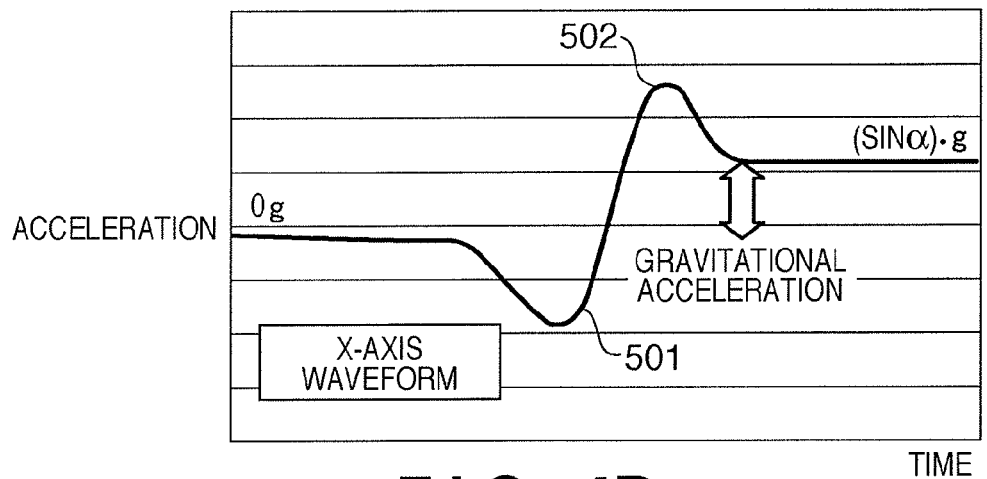
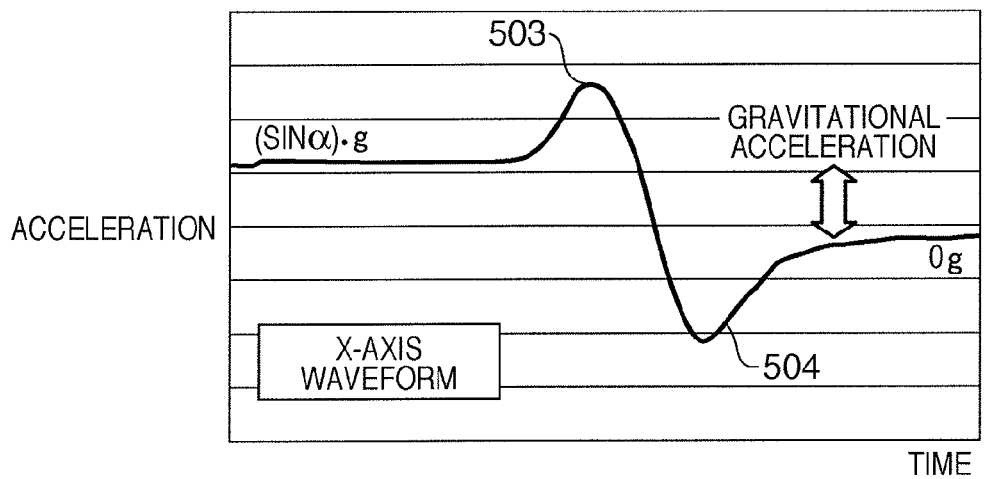
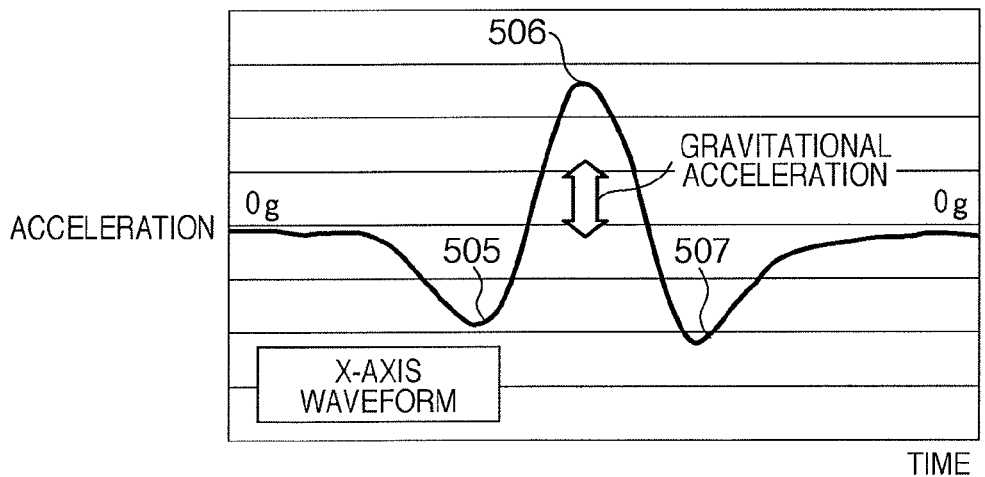

IMAGE CAPTURING APPARATUS AND CONTROL METHOD THEREOF

CROSS-REFERENCE TO RELATED APPLICATIONS

This application is a continuation of application Ser. No. 13/194,304, filed Jul. 29, 2011; which is a national phase under 35 U.S.C. 371 of International Application No. PCT/JP2010/000825, filed Feb. 10, 2010; the entire disclosures of which are hereby incorporated by reference.

BACKGROUND OF THE INVENTION

1. Field of the Invention

The present invention relates to an image capturing apparatus and a control method thereof.

2. Description of the Related Art

Image capturing apparatuses such as digital cameras and digital video cameras are provided with a variety of operation devices (buttons, switches, and the like). However, as such image capturing apparatuses have become more compact, the installation space to accommodate these operation devices has become insufficient. It is possible to make the operation devices more compact to fit the size of the installation space, but there is a limit to how much operation devices can be compacted.

Accordingly, Japanese Patent Laid-Open No. 2000-125184 proposes an image capturing apparatus that accept input instructions without the use of operation devices, by utilizing a shake sensor provided for camera shake detection.

The technology described in Japanese Patent Laid-Open No. 2000-125184 allows instructions to be input using operation devices as well as by shaking the image capturing apparatus. And, input from the operation devices is accepted even in a period in which shake is being detected.

Consequently, there is the problem that, when the user is shaking the image capturing apparatus in order to input a desired instruction and accidentally operates an operation device such as a menu button or the like, an unintended instruction could be detected by the image capturing apparatus.

However, the technology described in Japanese Patent Laid-Open No. 2000-125184 allows instructions to be input using operation devices as well as by shaking the image capturing apparatus. And, input from the operation devices is accepted even in a period in which shake is being detected.

Consequently, there is the problem that, when the user is shaking the image capturing apparatus in order to input a desired instruction and accidentally operates an operation device such as a menu button or the like, an unintended instruction could be detected by the image capturing apparatus.

SUMMARY OF THE INVENTION

The present invention has been conceived in light of the problem in the background art as described above, and provides an image capturing apparatus or method which denies unintended instructions from being input to the image capturing apparatus even when the user is shaking the image capturing apparatus in order to input a desired instruction and accidentally operates an operation device such as a menu button or the like.

In order to solve the above-mentioned problem, according to the present invention, there is provided an apparatus having an operation unit to enable a user to input an instruction to the apparatus, the apparatus comprising: a shake detection unit that detects an acceleration of a shake applied to the apparatus; an operation detection unit that detects a shake applied by a user in order to execute a predetermined process from output of the shake detection unit; and a control unit that invalidates operation of at least a portion of the operation unit when a shake applied by the user is detected.

According to another aspect of the present invention, there is provided an apparatus having an operation unit to enable a user to input an instruction to the apparatus, the apparatus comprising: a shake detection unit that detects an acceleration of a shake applied to the apparatus; an operation detection unit that detects a shake applied by a user in order to execute a predetermined process from output of the shake detection unit; and a control unit that invalidates operation of at least a portion of the operation unit while a shake applied by the user is being detected.

According to further aspect of the present invention, there is provided a control method for an apparatus having an operation unit to enable a user to input an instruction to the apparatus, the control method comprising: a shake detection step of detecting an acceleration of a shake applied to the apparatus; an operation detection step of detecting a shake applied by a user in order to execute a predetermined process from output from the shake detection step; and a control step of invalidating operation of at least a portion of the operation unit when a shake applied by the user is detected.

According to yet further aspect of the present invention, there is provided a control method for an apparatus having an operation unit to enable a user to input an instruction to the apparatus, the control method comprising: a shake detection step of detecting an acceleration component of a shake applied to the apparatus; an operation detection step of detecting a shake applied by a user in order to execute a predetermined process from output from the shake detection step; and a control step of invalidating operation of at least a portion of the operation unit while a shake applied by the user is being detected.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, explain the principles of the invention.

FIG. 4A is a diagram showing an example of an output signal of the acceleration sensor when the camera according to embodiments of the present invention is waved upward αdegrees about the Z axis from a normal position;

FIG. 4B is a diagram showing an example of the output signal of the acceleration sensor when the camera according to embodiments of the present invention is waved downward to a normal position from a position waved upward αdegrees about the Z axis;

FIG. 4C is a diagram showing an example of the output signal of the acceleration sensor when the camera according to embodiments of the present invention is waved upward αdegrees about the Z axis from the normal position and then further waved downward to the normal position from the position waved upward αdegrees about the Z axis;

DESCRIPTION OF THE EMBODIMENTS

Exemplary embodiments of the present invention will be described in detail in accordance with the accompanying drawings.

(First Embodiment)

Figure 1:
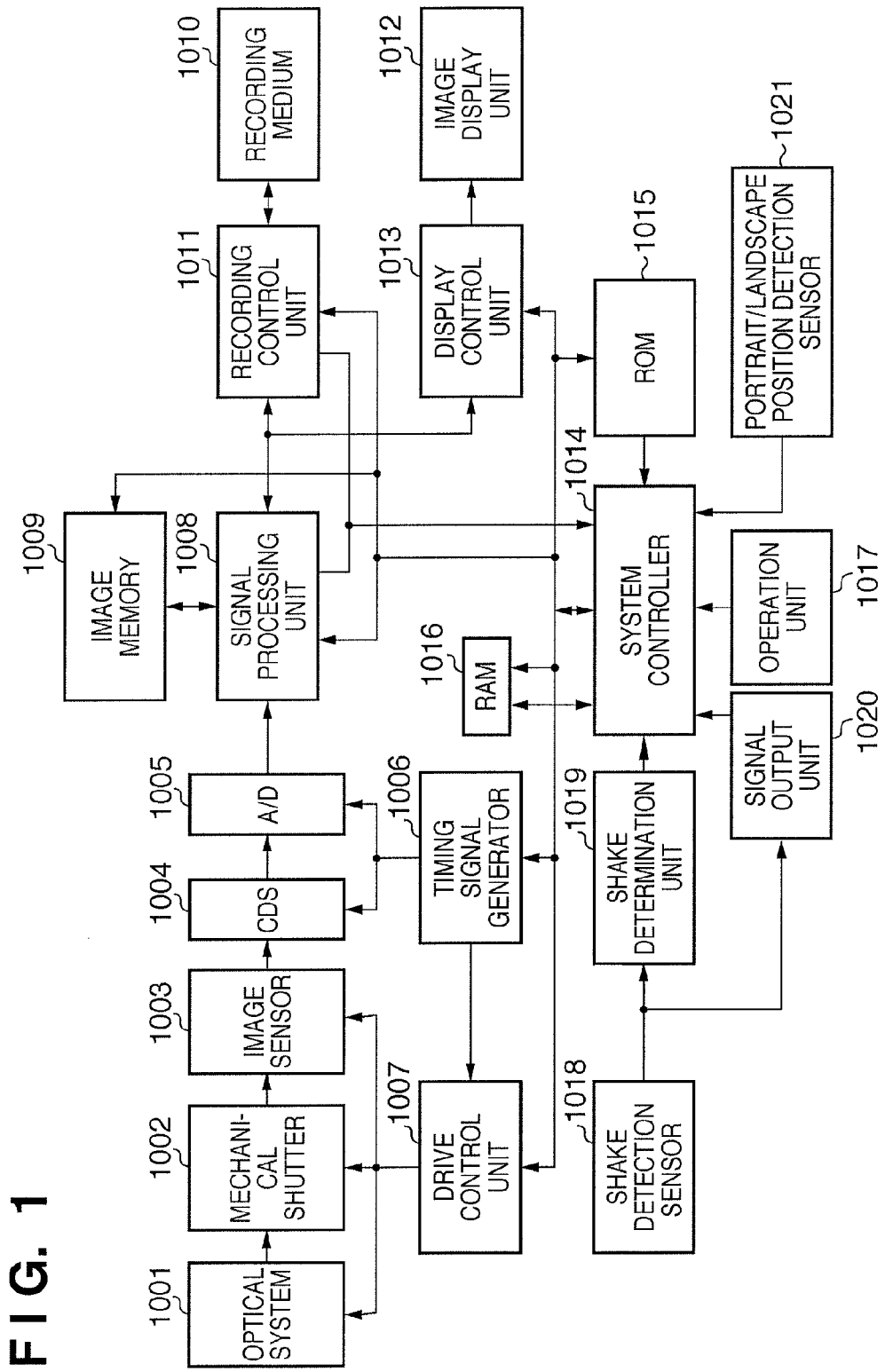
FIG. 1 is a block diagram illustrating a functional configuration example of a digital still camera as one example of an image capturing apparatus according to embodiments of the present invention.

FIG. 1 is a block diagram illustrating a functional configuration example of a digital still camera (hereinafter referred to simply as camera) as one example of an image capturing apparatus according to a first embodiment of the present invention.

Incident light from a subject is focused by an optical system 1001 composed of a lens and an aperture as a subject image on an image capturing surface of an image sensor 1003, which is a photoelectric converter element such as a CCD or a CMOS image sensor. A mechanical shutter 1002, under the control of a drive control unit 1007, opens and closes a light path from the optical system 1001 to the image sensor 1003.

A CDS circuit 1004 includes a correlated double sampling circuit and performs analog signal processing such as correlated double sampling on analog image signals output from the image sensor 1003. An A/D converter (A/D) 1005 converts the analog signals that the CDS circuit 1004 outputs into digital signals. A timing signal generator 1006 generates signals that operate the drive control unit 1007, the image sensor 1003, the CDS circuit 1004 and the A/D converter 1005.

According to signals from the timing signal generator 1006, the drive control unit 1007 drives aperture and autofocus mechanisms of the optical system 1001, the mechanical shutter 1002, and the image sensor 1003.

A signal processing unit 1008 performs signal processing such as color interpolation and white-balance processing on digital image data output by the A/D converter 1005 in order to generate image data for display and recording. An image memory 1009 stores image data processed by the signal processing unit 1008. A recording control unit 1011 records image data output by the signal processing unit 1008 on a removable recording medium 1010 such as a memory card or the like that can be removed from the camera. The recording control unit 1011 also reads out image data recorded on the recording medium 1010.

A display control unit 1013 generates signals for display from the image data output by the signal processing unit 1008 and displays them on an image display unit 1012. A system controller 1014 controls the entire camera.

A nonvolatile memory (ROM) 1015 stores programs that describe the control that the system controller 1014 carries out, control data such as parameters, tables, and the like used when executing the programs, and correction data such as defective pixel addresses of the image sensor 1003. When the system controller 1014 is running, the programs stored in the ROM 1015, the control data, and the correction data are sent to a RAM 1016.

An operation unit 1017 includes operation devices, such as buttons, switches, touch panels, and the like, to enable a user to input instructions to the camera. The operation unit 1017 also includes a mode switch and can selectively set individual function modes such as a power-off mode, an image capturing mode, a reproduction mode, and a PC connection mode.

A shake detection sensor 1018 is an acceleration sensor in the present embodiment, and detects a shake applied to the camera. A shake determination unit 1019 determines the validity of instructions input from the operation unit 1017 based on output from the shake detection sensor 1018. A signal output unit 1020 detects a shake of the camera based on the output from the shake detection sensor 1018, and from the information of the shake thus detected recognizes an instruction that is input as the user shakes the camera. Although in the present embodiment an instruction is recognized depending on the direction of the detected shake, other information about the shake, such as the size of the shake and the number of shakes, may be taken into consideration as well. Then, based on the recognition results, the signal output unit 1020 outputs to the system controller 1014 a signal that represents some instruction that can be input by operating the operation devices included in the operation unit 1017.

The signal output unit 1020 has, for example, a table, not shown, that correlates information relating to shaking, such as the direction of the shake and the number of shakes, with corresponding instructions. The signal processing unit 1020 checks the table and recognizes the instruction according to the information relating to the shake that is detected based on the output of the shake detection sensor 1018. In the present embodiment, the signals that the signal output unit 1020 outputs to the system controller 1014 are the same signals as are output to the system controller 1014 when any of the operation devices of the operation unit 1017 is operated. That is, in the camera of the present embodiment, at least some of the instructions which can be input using the operation unit 1017 can also be input by shaking the camera in a particular direction.

A portrait/landscape position detection sensor 1021, provided as necessary, detects whether the camera is in portrait or landscape position, and outputs the detection results to the system controller 1014. It is to be noted that the portrait/landscape position detection sensor 1021 may also be used to detect shaking of the camera. In this case, the shake detection sensor 1018 is unnecessary.

Next, a description is given of an image capturing operation (a normal still image capturing operation) using the mechanical shutter 1002 in a camera having a configuration like that described above.

Prior to the image capturing operation, when the system controller 1014 is commencing operation (such as when the camera is powered on), the system controller 1014 transmits the necessary programs, control data, and correction data from the ROM 1015 to the RAM 1016 for storage. In addition, the system controller 1014 may transmit additional programs and control data as necessary from the ROM 1015 to the RAM 1016 for use, read out the data in the ROM 1015 directly for use, or the like.

Figure 2A:
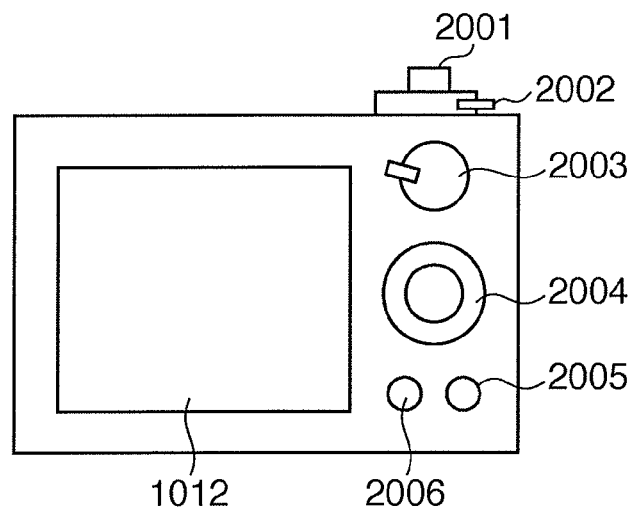
FIG. 2A is a back surface view showing an example of the appearance of the camera according to embodiments of the present invention.

FIG. 2A is a back surface view showing an example of the appearance of the camera according to embodiments of the present invention.

In the example shown in FIG. 2A, a release button 2001 and a zoom lever 2002 for changing the focal length of a zoom lens of the optical system 1001 are provided on an upper surface of the camera. In addition, a mode dial 2003 for changing image capturing mode and a function button 2004 including directional cursor and set keys for carrying out various settings are provided on a back surface of the camera. A menu button 2005 for displaying various setting menus on the image display unit 1012 and a display button 2006 for switching the display on the image display unit 1012 are further provided on the back surface. These buttons, dials, and keys are all included in the operation unit 1017.

The release button 2001 has a structure such that, when depressed approximately halfway, a first switch comes ON, and when fully depressed, a second switch comes ON. When the first switch is turned ON, the system controller 1014 commences image capturing preparation operations, including AE and AF processes. Then, the system controller 1014 drives the aperture and lens of the optical system 1001 through the drive control unit 1007 and forms a subject image of appropriate brightness on the image sensor 1003. Then, when the second switch comes ON, the system controller 1014 commences an image capturing operation (i.e., shoots for recording), opening the mechanical shutter 1002 through the drive control unit 1007 for an appropriate exposure time based on the AE and exposing the image sensor 1003. It is to be noted that, in a case in which the image sensor 1003 has an electronic shutter function, it may be used together with the mechanical shutter 1002 to secure the necessary exposure time.

The image sensor 1003 is driven by drive pulses generated from operating pulses generated by the timing signal generator 1006, which is controlled by the system controller 1014, and photoelectrically converts the focused subject image into electrical signals that are then output as analog image signals. Clock-synchronized noise is removed from the analog image signals output from the image sensor 1003 at the CDS circuit 1004, which runs on operating pulses generated by the timing signal generator 1006, and then the analog image signals are converted into digital image signals by the A/D converter 1005.

Next, at the signal processing unit 1008, which is controlled by the system controller 1014, the digital image signals output by the A/D converter 1005 are subjected to color conversion, white balance, gamma correction and other image processing, resolution conversion processing, image compression processing and so forth to generate image data.

The image memory 1009 is used for temporarily storing digital image signals during processing by the signal processing unit 1008, storing image data that is the signal-processed digital image signals, and the like. The image data generated by the signal processing unit 1008 is converted into data suitable for the recording medium 1010 (for example, file system data having a hierarchical structure) at the recording control unit 1011 and recorded on the recording medium 1010. In addition, the image data is converted into signals suitable for the image display unit 1012 after resolution conversion by the signal processing unit 1008 at the display control unit 1013 (for example, NTSC format analog signals) and displayed on the image display unit 1012.

At this point, the signal processing circuit 1008 may output the digital image signals as is as image data to the image memory 1009 or to the recording control unit 1011 depending on the control signals from the system controller 1014 without performing image processing on the digital image signals. In a case in which there is a request from the system controller 1014, the signal processing unit 1008 outputs digital image signals and image data information produced during the course of signal processing, or information extracted from such information, to the system controller 1014. Such information includes, for example, spatial frequency of the image, average pixel value within specified areas, data amount of the compressed image, and the like. Further, the recording control unit 1011 outputs information such as type and unused capacity of the recording medium 1010 to the system controller 1014 in response to a request from the system controller 1014.

When reproducing the image data recorded on the recording medium 1010, the recording control unit 1011 reads out the image data to be reproduced from the recording medium 1010 upon a control signal from the system controller 1014. Then, the signal processing unit 1008 decompresses the image data if it is a compressed image and stores the image data in the image memory 1009 in accordance with the control signal from the system controller 1014. The image data stored in the image memory 1009, after it is converted to a display resolution suitable for the resolution of the image display unit 1012 by the signal processing unit 1008, is then converted into a signal suitable for the image display unit 1012 at the display control unit 1013 and displayed on the image display unit 1012.

Next, a description is given of the shake determination unit 1019.

Figure 2B:
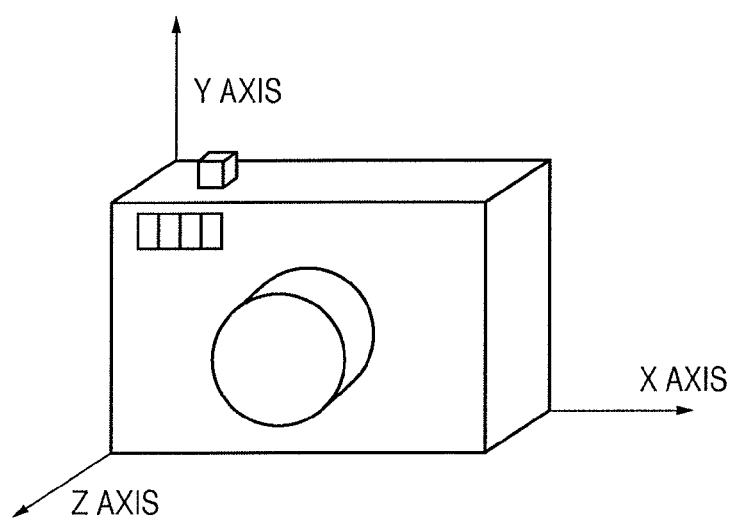
FIG. 2B is a front surface view showing an example of the appearance of the camera according to embodiments of the present invention upon setting coordinate axes for the camera.

The shake detection sensor 1018 is, for example, in the present embodiment, an acceleration sensor and detects an acceleration component of a shake applied to the camera and detects a camera shake operation. The shake detection sensor 1018 is capable of independently detecting acceleration of the camera in each of three directions, an X-axis direction, a Y-axis direction, and a Z-axis direction in a coordination system shown in FIG. 2B (referred to as a camera coordinate system hereinafter). The orientation of the camera shown in FIG. 2B is called the normal position. In this case, for example, the camera coordinate system can be defined as a coordinate system of which the Y axis directs to the counter direction in which the force of gravity is exerted, the Z axis directs in parallel with the optical axis of the optical system 1001, and the X axis directs to a direction orthogonal to the Y axis and the Z axis (i.e., the horizontal direction).

It is to be noted that, if a shake in one or more particular directions can be detected, there is no particular limitation on the type and number of sensors and their disposition. For example, in place of the acceleration sensor it is also possible to use an angular velocity sensor or a gravity sensor. It is to be noted that, in a case in which the camera has a camera shake detection sensor or the portrait/landscape position detection sensor 1021, these may be used as the shake detection sensor of the present embodiment. In addition, although in FIG. 2B the origin of the camera coordinate system is shown as coinciding with one apex in a case in which a housing of the camera is considered to be a rectangle, there are no particular limitations on the position of the origin.

<Acceleration Detection Waveform in Waving/Shaking Operation>

Output signals indicating acceleration in the direction of each axis obtained by the shake detection sensor 1018 are input to the shake determination unit 1019. FIGS. 4A to 4C and 5A show examples of signals input to the shake determination unit 1019 from the shake detection sensor 1018.

FIGS. 4A to 4C show signal waveforms showing changes over time in acceleration component in the X-axis direction detected by the shake detection sensor 1018 when the camera is waved upward or downward. The abscissa indicates time, and the ordinate indicates the acceleration component detected when the camera is waved upward from a horizontal orientation.

Figure 3A:
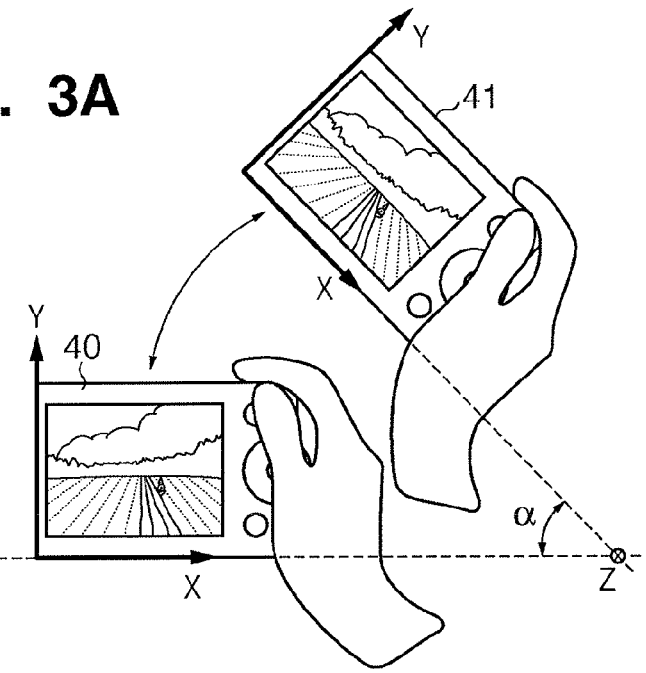
FIG. 3A is a diagram for explaining an operation of waving the camera upward (degrees about a Z axis from a normal position.
Figure 3B:
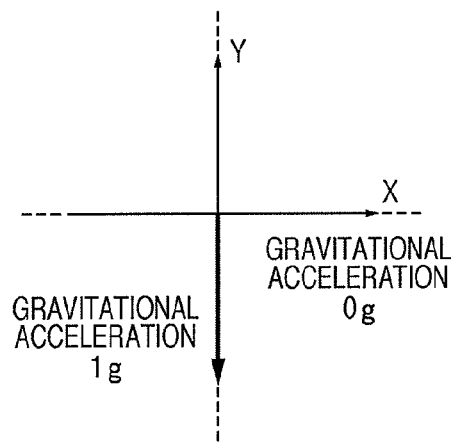
FIG. 3B is a diagram for explaining directions of acceleration that an acceleration sensor of the camera according to embodiments of the present invention detects.
Figure 3C:
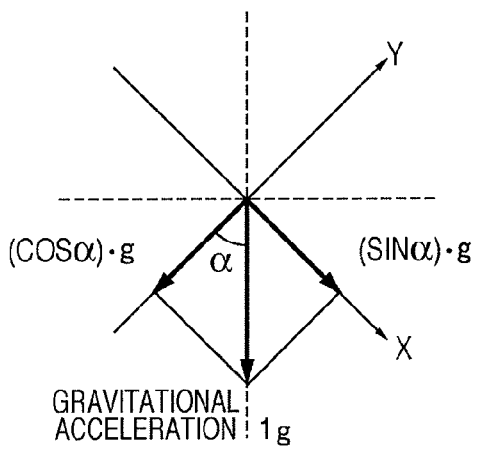
FIG. 3C is a diagram for explaining directions of acceleration that the acceleration sensor of the camera according to embodiments of the present invention detects.

FIG. 4A shows a signal waveform indicating change over time in acceleration component in the X-axis direction when the camera is accelerated at the upward waving start timing from a horizontal state, is decelerated at the upward waving end timing, and is stopped. FIG. 4A corresponds to a transition from a state 40 to a state 41 in FIG. 3A, and accelerations are detected in acceleration (peak 501) at the start of waving and in deceleration (peak 502) at the end of waving. The camera coordinate system shifts from a state shown in FIG. 3B to that shown in FIG. 3C, so a gravitational acceleration component in the X-axis direction in a still state changes from 0 g level, as shown in FIG. 3B, to (sin α)·g level, as shown in FIG. 3C, before and after waving.

Also, FIG. 4B shows a signal waveform indicating change over time in acceleration component in the X-axis direction detected by the shake detection sensor 1018 when the camera is accelerated and waved downward from the state in which it is waved upward, is decelerated upon being waved downward to a horizontal position, and is stopped. That is, FIG. 4B corresponds to a transition from a state 41 to a state 40 in FIG. 3A, and accelerations are detected in acceleration (peak 503) at the start of waving and in deceleration (peak 504) at the end of waving. The camera coordinate system shifts from a state shown in FIG. 3C to that shown in FIG. 3B, so a gravitational acceleration component in the X-axis direction in a still state changes from (sin α)·g level, as shown in FIG. 3C, to 0 g level, as shown in FIG. 3B, before and after waving.

FIG. 4C shows a signal waveform indicating change over time in acceleration component in the X-axis direction detected by the shake detection sensor 1018 when the camera is waved upward and then waved downward. As can be seen from comparisons between FIGS. 4A to 4C, the signal waveform shown in FIG. 4C is nearly the sum of the signal waveforms shown in FIGS. 4A and 4B. A peak 505 shown in FIG. 4C is an acceleration peak that appears upon executing an upward waving operation. A peak 506 is an acceleration peak that appears upon composition of deceleration in upward waving and acceleration in downward waving, when downward waving is to be started after the end of upward waving. A peak 507 is an acceleration peak that appears in deceleration at the end of the downward operation. The peak 505 indicating the acceleration at the start of upward waving is defined as a first acceleration waveform, the peak 506 indicating the composition of the accelerations at the end of upward waving and at the start of downward waving is defined as a second acceleration waveform, and the peak 507 indicating the acceleration at the end of downward waving is defined as a third acceleration waveform.

Among others, the peak 506 defined as the second acceleration waveform is likely to increase by a gravitational acceleration, and therefore can be effectively used when a camera waving operation is detected based on the acceleration. Although FIG. 4C shows the signal waveform of an acceleration detected upon an operation of waving the camera up once and then waving it downward, a signal waveform out of phase with that shown in FIG. 4C is detected upon an operation of waving the camera downward once and then waving it upward.

Figure 5A:
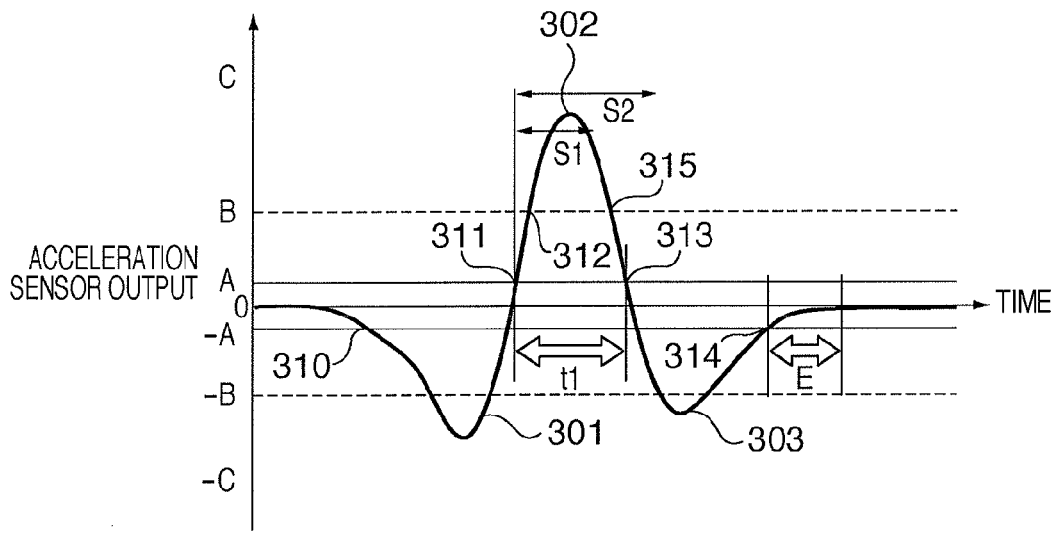
FIG. 5A is a diagram for explaining a detailed example of an acceleration waveform obtained by a waving operation of the present invention in the image capturing apparatus according to the present invention.

FIG. 5A shows an example of the signal waveform of an acceleration component in the X-axis direction detected by the shake detection sensor 1018 (an acceleration sensor in the present embodiment) when the camera is waved upward and then waved downward, as in FIG. 4C. The abscissa indicates time, the ordinate indicates the output of the shake detection sensor 1018, and each sign indicates the direction of acceleration.

Thresholds A and −A defined as first thresholds are used to determine whether the camera in the present embodiment is moving. More specifically, the shake determination unit 1019 determines that the camera is still if the absolute value of the acceleration detected by the shake detection sensor 1018 falls within the range of the threshold A or less, and determines that the camera is moving if the absolute value of the acceleration is equal to or larger than the first threshold.

Also, thresholds B and −B defined as second thresholds are used to determine whether the camera is waved with predetermined waving characteristics. The thresholds A, −A, B, and −B are set to satisfy relations: Threshold −B<Threshold −A and Threshold A<Threshold B. If the absolute value of the acceleration detected by the shake detection sensor 1018 is greater or equal to the threshold A and is smaller than the threshold B, the shake determination unit 1019 determines that the camera is moving but is not waved with predetermined waving characteristics. On the other hand, if the absolute value of the acceleration detected by the shake detection sensor 1018 is greater or equal to the threshold B, the shake determination unit 1019 determines that the camera is moving and is waved with predetermined waving characteristics.

Moreover, thresholds C and −C defined as third thresholds are used to determine whether the camera is waved within a predetermined strength range. The thresholds B, −B, C, and −C are set to satisfy relations: Threshold −C<Threshold −B and Threshold B<Threshold C. If the absolute value of the acceleration detected by the shake detection sensor 1018 is equal to or larger than the threshold B and is smaller than the threshold C, the shake determination unit 1019 determines that the camera is waved with predetermined waving characteristics within a predetermined strength range. On the other hand, if the absolute value of the acceleration detected by the shake detection sensor 1018 is equal to or larger than the threshold C, the shake determination unit 1019 determines that the camera is waved too strongly. When the camera is waved strongly, the possibility that the user falls it off his or her hand by mistake increases, so a warning is issued if it is determined that the camera is waved too strongly. As a warning method, a warning message may be displayed on the image display unit 1012 or a warning sound may be generated by a loudspeaker.

The shake determination unit 1019 may compare the acceleration detected by the shake detection sensor 1018 with positive and negative thresholds, instead of comparing the absolute value of the acceleration value with thresholds having the same absolute value. Assume, for example, that the shake determination unit 1019 compares the detected acceleration with the first thresholds. If the detected acceleration is from −A (exclusive) to +A (exclusive), the shake determination unit 1019 determines that the camera is still (is not waved). On the other hand, if the detected acceleration is −A or less or +A or more, the shake determination unit 1019 determines that the camera is moving. The same holds true for the remaining thresholds.

Because the camera is likely to be waved more strongly in a targeted operation than in its preparation operation, a peak 302 with the largest absolute value of the acceleration among peaks 301 to 303 in the signal waveform shown in FIG. 5A corresponds to the second acceleration waveform shown in FIG. 4C. In other words, the signal waveform indicates a downward waving operation when an operation of waving the camera downward is targeted, and an upward waving operation when an operation of waving the camera upward is targeted. In this case, the peak 301 corresponds to the first acceleration waveform shown in FIG. 4C, and indicates acceleration in an upward waving operation that is a downward waving preparation operation if the targeted operation is downward waving. Also, the peak 303 corresponds to the third acceleration waveform shown in FIG. 4C, and indicates a waveform obtained upon detecting deceleration in downward waving. If the targeted operation is an upward waving operation, the waveform is bilaterally symmetrical about the X axis (has opposite signs with respect to the X axis), so the first acceleration waveform 301 and third acceleration waveform 303 indicate upward waving. It is to be noted that a waveform with the largest absolute value of the acceleration does not always indicate a targeted operation. A method of detecting a targeted operation in the present invention will be described later.

Reference numeral 310 denotes a time point when the first acceleration waveform 301 crosses over the threshold A (or the threshold −A). Reference numeral 311 denotes a time point when the second acceleration waveform 302 crosses over the threshold A (or the threshold −A) for the first time; and 313, a time point when the second acceleration waveform 302 crosses over the threshold A (or the threshold −A) again. Reference numeral 314 denotes a time point when the third acceleration waveform 303 crosses over the threshold A (or the threshold −A) again after crossing it over once. Thresholds S1 and S2 are thresholds in a duration t1 in which the second acceleration waveform indicating a targeted operation (main operation) is kept greater or equal to the threshold A or smaller or equal to the threshold −A. That is, the duration t1 is from when the second acceleration waveform 302 becomes greater or equal to the threshold A until it becomes equal to the threshold A again (or from when it becomes smaller or equal to the threshold −A until it becomes equal to the threshold −A again). In the present embodiment, if a condition: Threshold S1≤Duration t1≤Threshold S2 is satisfied, the shake determination unit 1019 determines that a second acceleration waveform (main operation) is detected.

Also, if the camera is kept in a state, in which it is determined to be still (a state in which the acceleration is from the threshold −A (exclusive) to the threshold A (exclusive)), for a time equal to or longer than a threshold E, the shake determination unit 1019 determines that the camera is at a position at which a waving operation is stopped. In this case, if the camera is kept in a state in which it is determined to be still for a time shorter than the threshold E, the shake determination unit 1019 determines that an operation started at a time point when the acceleration becomes greater or equal to the threshold A or smaller or equal to the threshold −A for the first time continues (one waving operation is done).

Therefore, the shake determination unit 1019 determines that, for example, the third acceleration waveform 303 shown in FIG. 5A indicates an operation continuous with those indicated by the first acceleration waveform 301 and second acceleration waveform 302. If a state in which the acceleration is from the threshold −A (exclusive) to the threshold A (exclusive) continues for a time equal to or longer than the threshold E from the time point 314, and then the acceleration becomes smaller or equal to the threshold −A or greater or equal to the threshold A again, the shake determination unit 1019 determines that a new operation is started.

Although three thresholds A, B, and C, each having the same absolute value, are used as thresholds for the acceleration level in FIG. 5A, one or more of positive and negative thresholds may have different absolute values.

Figure 5B:
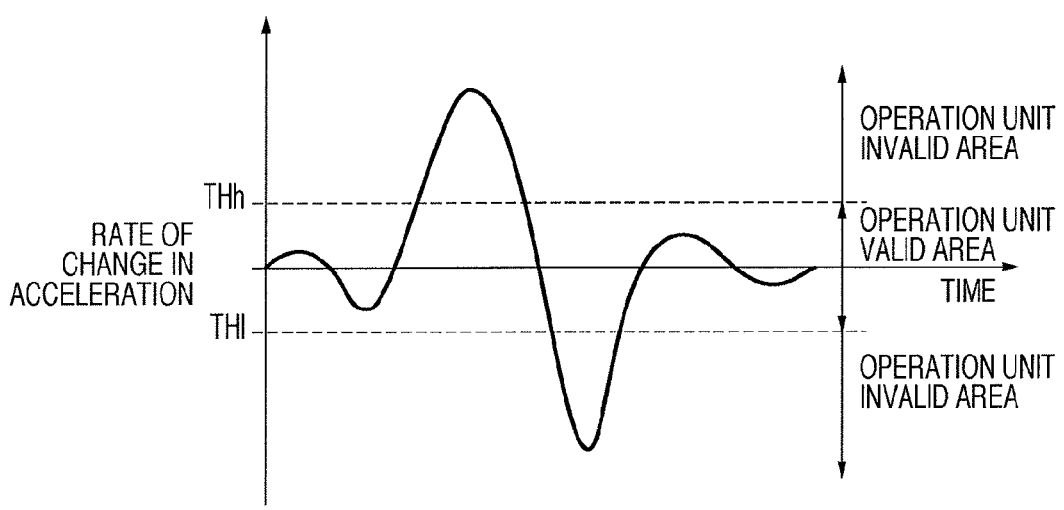
FIG. 5B is a diagram showing the change over time of the acceleration signal when an offset component is removed from the acceleration output signal.

FIG. 5B is a diagram showing change over time in a rate of change in the acceleration signal when an offset component is removed from the acceleration output signal shown in FIG. 5A. The rate of change in the acceleration signal may be used as the threshold used to determine whether the camera is moving or still, having been described with reference to FIG. 5A. In this case, thresholds THh and THl are used in place of the thresholds ±A in FIG. 5A. It is to be noted that thresholds THh and THl may be used in place of the thresholds ±B or ±C in FIG. 5A, and a threshold for the rate of change in the acceleration signal may be separately determined.

Based on the acceleration signal output or the rate of change in the acceleration signal in the direction of a given axis as shown in FIG. 5A or in FIG. 5B, the shake determination unit 1019 determines whether or not the camera is shaking along that axis and outputs the results of that determination to the system controller 1014. Based on the results of the determination, the system controller 1014 validates or invalidates operation of the camera by the operation devices included in the operation unit 1017.

<User Operation Recognition Process>

Figure 6:
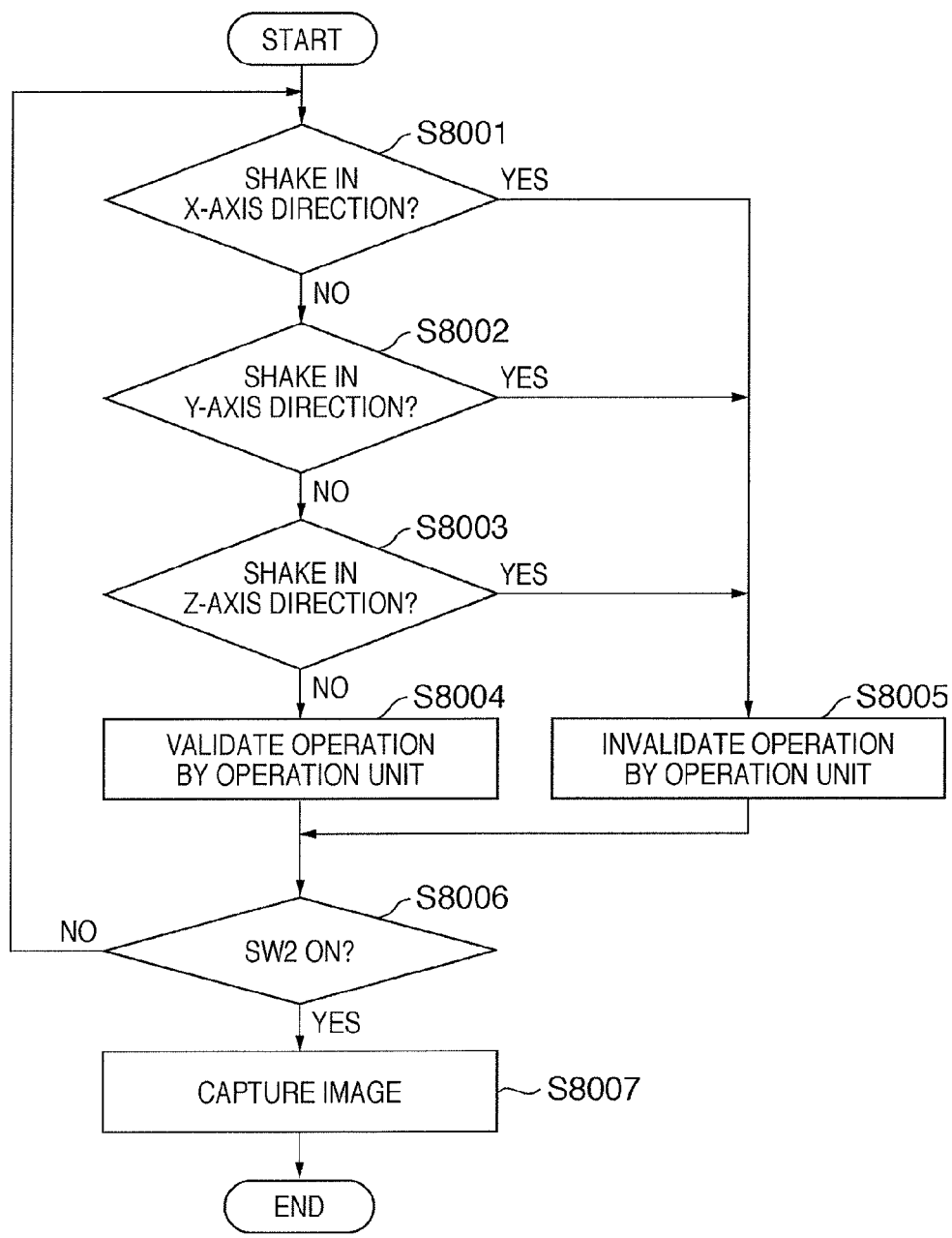
FIG. 6 is a flowchart for explaining outlines of a user operation recognition process in an image capturing mode of the camera according to a first embodiment of the present invention.

FIG. 6 is a flowchart illustrating outlines of a user operation recognition process during image capture standby of the camera according to the present embodiment.

First, from the acceleration output signals in the X-axis direction of the shake detection sensor 1018, the shake determination unit 1019 determines whether or not the camera is shaking in the X-axis direction (S8001). The shake determination unit 1019, using, for example, the size, direction, and frequency of peaks in the acceleration signal output or the acceleration signal rate of change in the X-axis direction as a reference, determines whether or not the camera is shaking in the X-axis direction.

More specifically, as an example, the shake determination unit 1019 determines that the camera is shaking in the X-axis direction whenever either a state that satisfies the following two criteria continues for a certain period of time or a predetermined number of consecutive peaks satisfy the same two criteria:

(1) a period during which peaks in the acceleration signal output or the rate of change in the acceleration signal in the X-axis direction are outside a predetermined threshold range (from A to −A when the acceleration signal output is used, or from THh to THl when the rate of change in the acceleration signal is used) is equal to or less than a predetermined period; and (2) consecutive peaks are reversed.

As another example, the shake determination unit 1019

(a) determines that a shake is detected if the rate of change in the acceleration signal in the X-axis direction falls outside a predetermined threshold range (for example, the range of the thresholds ±A in FIG. 5A); and (b) determines that a waving operation is stopped when a state in which the rate of change in the acceleration signal in the X-axis direction falls within the predetermined threshold range continues for a predetermined time (for example, the threshold E in FIG. 5A) or more after it is determined in (a) that a shake is detected.

During the time from the state defined by (a) to that defined by (b), even if the rate of change in the acceleration signal in the X-axis direction falls within the predetermined threshold range (for example, the range of the thresholds ±A in FIG. 5A), it is determined that an operation is in progress.

By contrast, in the event that these criteria are not satisfied, the shake determination unit 1019 determines that the camera is not shaking in the X-axis direction. The shake determination unit 1019 can also make the same determination for the Y-axis direction and the Z-axis direction. It is to be noted that the above-described shake determination method is but one example thereof, and other methods may be used to determine the presence or absence of a shake.

If it is determined that the camera is not shaking in the X-axis direction, the shake determination unit 1019 determines whether or not the camera is shaking in the Y-axis direction from the acceleration output signals in the Y-axis direction of the shake detection sensor 1018 (S8002).

If it is determined that the camera is not shaking in the Y-axis direction either, the shake determination unit 1019 determines whether or not the camera is shaking in the Z-axis direction from the acceleration output signals in the Z-axis direction of the shake detection sensor 1018 (S8003).

The shake determination unit 1019 outputs the determination results along each axis to the system controller 1014. Then, in the event that determination results are obtained which indicate shaking in the direction of any of the axes, the system controller 1014 invalidates operation of the camera by the operation unit 1017 (S8005). When operations by the operation unit 1017 are invalidated, the system controller 1014 ignores input from the operation unit 1017. By so doing, even when (for example) the user in attempting to input a desired instruction shakes the camera and accidentally operates the menu button 2005, the mode dial 2003 or the like of the operation unit 1017, unintended input through the operation unit 1017 can be prevented.

However, in the present embodiment, operation of the release button 2001, in particular the second switch coming ON, is not ignored by the system controller 1014 even when operation by the operation unit 1017 is invalidated. Whether operation by the operation unit 1017 is valid or invalid can, for example, be stored as a flag in the RAM 1016.

It is to be noted that, although not specifically described in the flowchart shown in FIG. 6, in a case in which a shake in the direction of a particular axis is recognized as input of a command or an instruction, the system controller 1014 carries out a recognition process based on the detection results output by the shake determination unit 1019. Then, the system controller 1014 executes an operation according to the recognized command or instruction.

The shake determination unit 1019 may output the determination results at every determination along each of the axes, or it may output a combined determination for all the axes. In addition, the shake determination unit 1019 may output determination results only along that axis or axes along which it is determined that there is shaking (that is, if there is no axis along which it is determined that there is shaking, no determination result is output). Alternatively, in a case in which it is determined that there is shaking along an axis, the shake determination unit 1019 may omit determination processing for the remaining axes (excluding those instances in which a particular combination of shaking directions is set to be recognized as input of an instruction).

If it is determined that the camera is not shaking along any of the axes, the system controller 1014 validates operation of the camera by the operation unit 1017 (S8004). It is to be noted that, normally, the operation unit 1017 is valid. Accordingly, unless operation of the operation unit 1017 has been invalidated, it is not particularly necessary for the system controller 1014 to carry out processing for the purpose of validating its operation in S8004.

The system controller 1014 determines whether or not an instruction to commence image capturing has been input, that is, the system controller 1014 determines whether or not the second switch of the release button 2001 is ON (S8006). If the second switch is OFF, processing is repeated from S8001. When the second switch is ON, the system controller 1014 carries out the image capturing process even if operation of the camera by the operation unit 1017 is invalidated (S8007).

In other words, in the camera of the present embodiment, in a case in which it is detected that the second switch of the release button 2001 is ON, image capturing is executed. This is because there is a strong possibility that a full stroke operation of the release button 2001, by which the second switch comes ON, is likely to be not a mistaken operation but an intentional operation. By contrast, the first switch coming ON by a half stroke operation of the release button 2001 is ignored when the operation unit 1017 is invalidated. However, so long as the first switch is maintained in the ON state a shake of the camera along any of the X axis, Y axis, and Z axis is no longer detected, and once operation of the camera by the operation unit 1017 is validated, the coming ON of the first switch is validated as well. Then, the system controller 1014, in response to the coming ON of the first switch, commences such image capturing preparation operations as AE and AF.

Thus, as described above, in a camera that allows input of instructions and commands by shaking the apparatus, the present invention can reduce input of instructions that a user does not intend by unintended operation of buttons or keys when the apparatus is being shaken.

(Second Embodiment)

A distinctive feature of the present embodiment is that the user waves a portable device (for example, a camera in which at least one of a reproduction mode and an image capturing mode is settable) to enable an instruction of forward feed and backward feed of an image reproduced by the portable device. The user can watch an image recorded on a recording medium 1010 through, for example, an image display unit 1012 by, for example, setting the portable device in the reproduction mode. It is to be noted that the camera having been described in the first embodiment is used as an example of the portable device according to the present embodiment. Therefore, a description of, for example, a hardware configuration and a waving operation detection method is omitted. In the present embodiment as well, determination associated with a camera waving operation is performed by detecting an acceleration in the X-axis direction.

Figure 7:
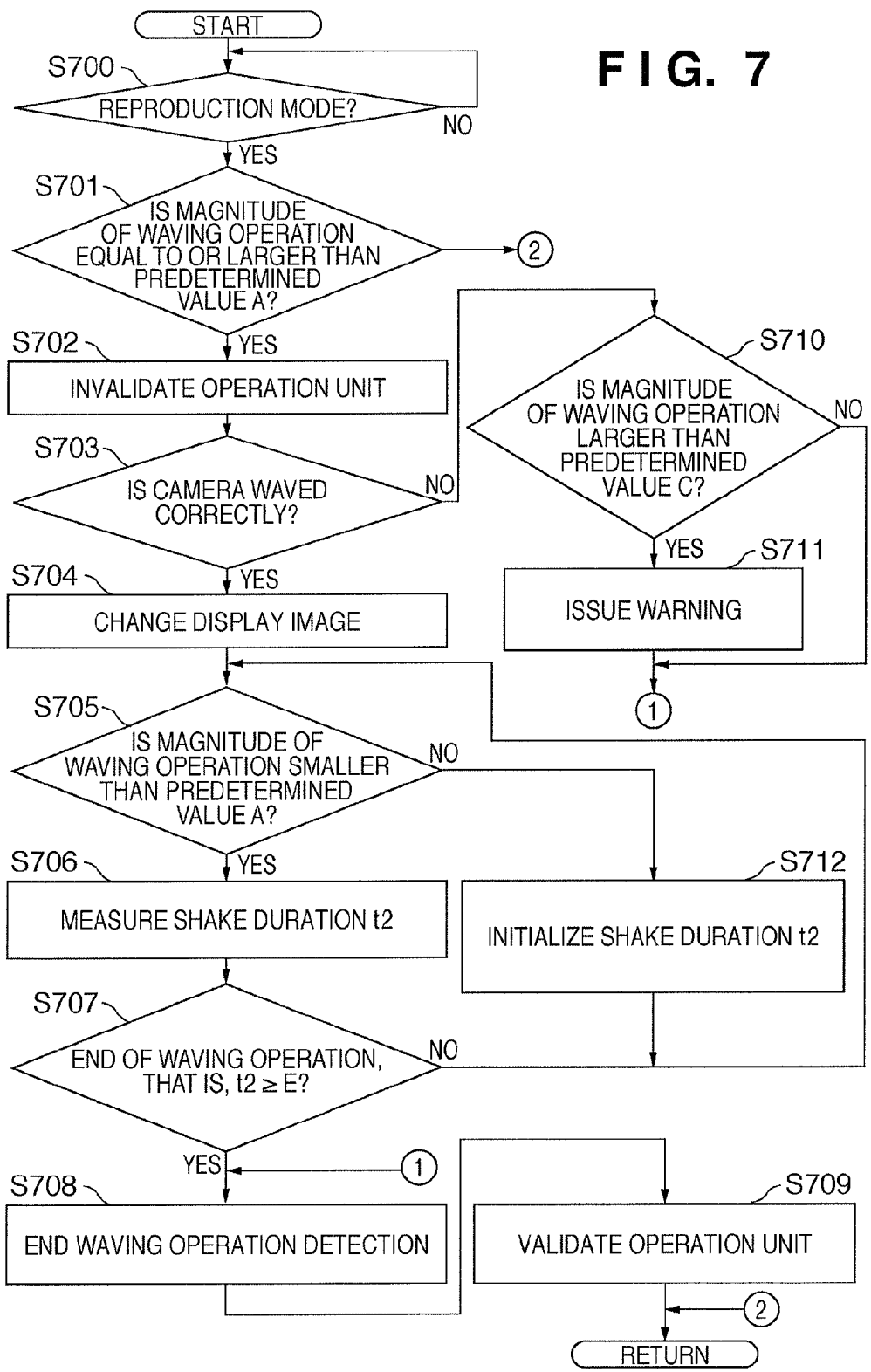
FIG. 7 is a flowchart for explaining outlines of image feed and user operation recognition processes in a reproduction mode of a camera according to a second embodiment of the present invention.

FIG. 7 is a flowchart for explaining a process associated with one waving operation. First, a system controller 1014 determines whether the camera is set in the reproduction mode (S700). If it is determined that the reproduction mode is set, the system controller 1014 executes processes in S701 and subsequent steps. If the acceleration detected by a shake detection sensor 1018 crosses over the threshold A or −A in FIG. 5A (the time point 310 shown in FIG. 5A), a shake determination unit 1019 detects that the camera has moved (S701). If the shake determination unit 1019 detects that the camera has moved (is waved), the system controller 1014 invalidates operation of the camera by an operation unit 1017 (S702).

Acceleration detection is performed in a predetermined detection period of the shake detection sensor 1018. Also, the shake determination unit 1019 stores the detection value obtained by the shake detection sensor 1018, and updates the peak value (minimum value) stored every time the previous peak value (minimum value) is updated to the detection value obtained for every detection period after the detection value falls below the threshold −A at the time point 310. Therefore, the shake determination unit 1019 can measure the peak value (minimum value) of the detection value after the detection value falls below the threshold −A. The shake determination unit 1019 can also measure the upward peak value (minimum value) in the same way.

When it is detected in S701 that the camera has moved, and a process of detecting an operation commences in S702, the shake determination unit 1019 detects a first acceleration waveform first. When the acceleration detected by the shake detection sensor 1018 crosses over the threshold A or −A after it is detected that the camera has moved, the shake determination unit 1019 determines that a first acceleration waveform is detected.

When a first acceleration waveform is detected, the shake determination unit 1019 performs a process of detecting a second acceleration waveform next. When the detected acceleration crosses over the threshold A (or the threshold −A) (time point 311), the shake determination unit 1019 detects the start of a second acceleration waveform. When the detected acceleration crosses over the threshold A (or the threshold −A) again in the duration t1 which satisfies a condition: Threshold S1≤Duration t1≤Threshold S2 (time point 313), the shake determination unit 1019 detects the end of the second acceleration waveform. As described above, if the duration t1 does not satisfy the above-mentioned condition, the shake determination unit 1019 does not determine that a second acceleration waveform is detected. Further, if the detected acceleration crosses over the threshold B (or the threshold −B) (time point 312) and does not reach the threshold C (or the threshold −C) from the time point 311 to the time point 313, the shake determination unit 1019 determines that the camera is waved correctly (waved with a predetermined strength) (Yes in S703).

Also, based on the sign of the threshold B over which the second acceleration waveform crosses, the shake determination unit 1019 discriminates whether the camera is waved upward or downward. On the other hand, if the second acceleration waveform does not cross over the threshold B (or the threshold −B) or reaches the threshold C (or the threshold −C), the shake determination unit 1019 determines that the camera is not waved correctly (No in S703). In this case, the shake determination unit 1019 discriminates in S710 whether the magnitude of the waving operation (the magnitude of detected acceleration) is larger than a predetermined value (the thresholds ±C in FIG. 5). If the peak value of the second acceleration waveform falls below the threshold B (or the threshold −B), the shake determination unit 1019 ends waving operation detection (S708). The system controller 1014 validates operation by the operation unit 1017 (S709). On the other hand, if the peak value of the second acceleration waveform reaches the threshold C (or the threshold −C), the shake determination unit 1019 issues a warning, as described above (S710). Processes in S708 and subsequent steps are as described above.

It is to be noted that a second acceleration waveform needs to be detected based on a threshold which is different in sign from that used in detecting a first acceleration waveform. If, for example, a first acceleration waveform is detected based on the threshold −A (if a first acceleration waveform with a concave peak is detected), a second acceleration waveform needs to be detected based on the threshold A. This is because the first acceleration waveform corresponds to a preparation operation before a main operation, and the main operation is reverse to the preparation operation.

If the shake determination unit 1019 determines in S703 that the camera is waved correctly, the system controller 1014 changes the image displayed on the image display unit 1012 via a display control unit 1013 at the time point at which the end of the second acceleration waveform is detected (S704). The end of the second acceleration waveform is detected at the time point (the time point 313 shown in FIG. 5) at which the second acceleration waveform crosses over the threshold A (or the threshold −A) again. In changing the image to be displayed, images may be changed in the order of file name or number, in the order of image capturing date/time, or in the order of date/time recorded on the recording medium 1010. The order of change in image may be switched between the forward and backward directions, depending on the sign of the threshold used in detecting a first or second acceleration waveform. Nevertheless, when a mode in which images are displayed in random order, as in random reproduction, is set, the image to be displayed is changed independently of the sign of the threshold.

In S705, the shake determination unit 1019 determines whether the acceleration detected by the shake detection sensor 1018 falls within the range of the threshold −A (exclusive) to the threshold A (exclusive). While the detected acceleration is kept within the range of the threshold −A (exclusive) to the threshold A (exclusive), the shake determination unit 1019 measures a shake duration t2 (S706). The shake determination unit 1019 determines whether the shake duration t2 is equal to or longer than a threshold E (S707). If the shake duration t2 is equal to or longer than the threshold E, the shake determination unit 1019 determines that the camera has come to rest, and waving operation detection ends (S708). The system controller 1014 validates operation by the operation unit 1017 (S709).

In this manner, operation of the camera by the operation unit 1017 is not validated unless a state in which the magnitude (absolute value) of the acceleration is smaller than a predetermined value continues for a predetermined time or more after it is determined that the camera has moved. In the example shown in FIG. 5A, the shake determination unit 1019 determines that a waving operation is in progress until the predetermined time E elapses from the time point 310 to a time point 314. Therefore, even if the acceleration signal output in the X-axis direction falls within the range of the thresholds ±A, operation by the operation unit 1017 is invalidated until that state continues for a time equal to the threshold E.

On the other hand, if it is determined in S705 that the detected acceleration is smaller or equal to the threshold −A or greater or equal to threshold A, the shake determination unit 1019 initializes the shake duration t2 (S712). The process returns to S705, in which the shake determination unit 1019 again determines whether the absolute value of the detected acceleration falls within the range of less than the threshold A.

Also, if the absolute value of the detected acceleration is smaller than the threshold A, but the shake duration t2 is less than the threshold E (No in S707), the shake determination unit 1019 repeats the processes in S705 and subsequent steps while incrementing the value of the shake duration t2.

As described above, in the present embodiment, even if the absolute value of the detected acceleration is smaller than a first threshold (smaller than the threshold A), unless this state continues for a time equal to or longer than the threshold E, it is determined that an operation from the time point at which the detected acceleration reaches the threshold A or −A first continues (one waving operation is done). This makes it possible to prevent determination that a third acceleration waveform corresponds to a new waving operation.

When the detected acceleration of the camera according to the present embodiment is greater or equal to a predetermined value but nonetheless acts in a timeframe that is too short or too long, or acts strongly, an error is determined to prevent detection that a waving operation is in progress. Thus, a waveform is detected with higher precision to provide an intuitive, friendly operation system. Also, if a still state does not continue for a predetermined time or longer, it is determined that one waving operation continues, thereby making it possible to precisely detect first, second, and third acceleration waveforms corresponding to a series of operations from a preparation operation to a main operation.

As has been described above, according to the present embodiment, it is possible to provide a camera which can change an image by waving the camera in a specific direction while this image is displayed, as in, for example, a reproduction mode. Also, even if the user operates the operation unit by mistake in a camera waving operation, unintended instructions are not reflected.

In the present embodiment, a case in which a function of changing the display image is assigned to a waving operation while the image is displayed in the reproduction mode has been taken as an example of a process for detecting a waving operation. However, the same detecting process can be performed when a function associated with image capturing in the image capturing mode is assigned to a waving operation as well. That is, once it is determined that the camera has moved, operation by the operation unit is not validated unless a state in which the magnitude (absolute value) of the acceleration is smaller than a predetermined value continues for a predetermined time or more.

Also, in the first embodiment, image capturing is executed when it is detected that the second switch of the release button 2001 is ON. In contrast to this, in the present embodiment, the camera may shift from the reproduction mode to the image capturing mode when a release button 2001 is operated in, for example, the reproduction mode. At this time, the first switch coming ON by a half stroke operation of the release button 2001 may be ignored in the reproduction mode, and a shift from the reproduction mode to the image capturing mode may be made when it is detected that the second switch of the release button 2001 is ON. In this case, so long as the first switch is maintained in the ON state a shake of the camera along any of the X axis, Y axis, and Z axis is no longer detected, and once operation of the camera by the operation unit 1017 is validated, the coming ON of the first switch is validated as well.

(Third Embodiment)

Next, a description is given of a third embodiment of the present invention. The configuration of the camera of the present embodiment can be the same as that of the first embodiment, and therefore a description of the configuration thereof is omitted. A distinctive feature the present embodiment is that, depending on the position of the camera (portrait position or landscape position) and the direction of the shake that is detected, of the operation unit 1017, validation/invalidation of those operation devices that are provided on the upper surface of the camera and those operation devices that are provided on the back surface of the camera is carried out separately. It is to be noted that, in the present embodiment, the operation devices to be validated/invalidated need not be those provided on the upper surface or the back surface of the camera but may be operation devices provided on any surface of the housing of the camera. That is, the present embodiment is applicable to operation devices provided on any one surface and on another surface of operation devices provided on at least two surfaces of the camera housing.

Figure 8A:
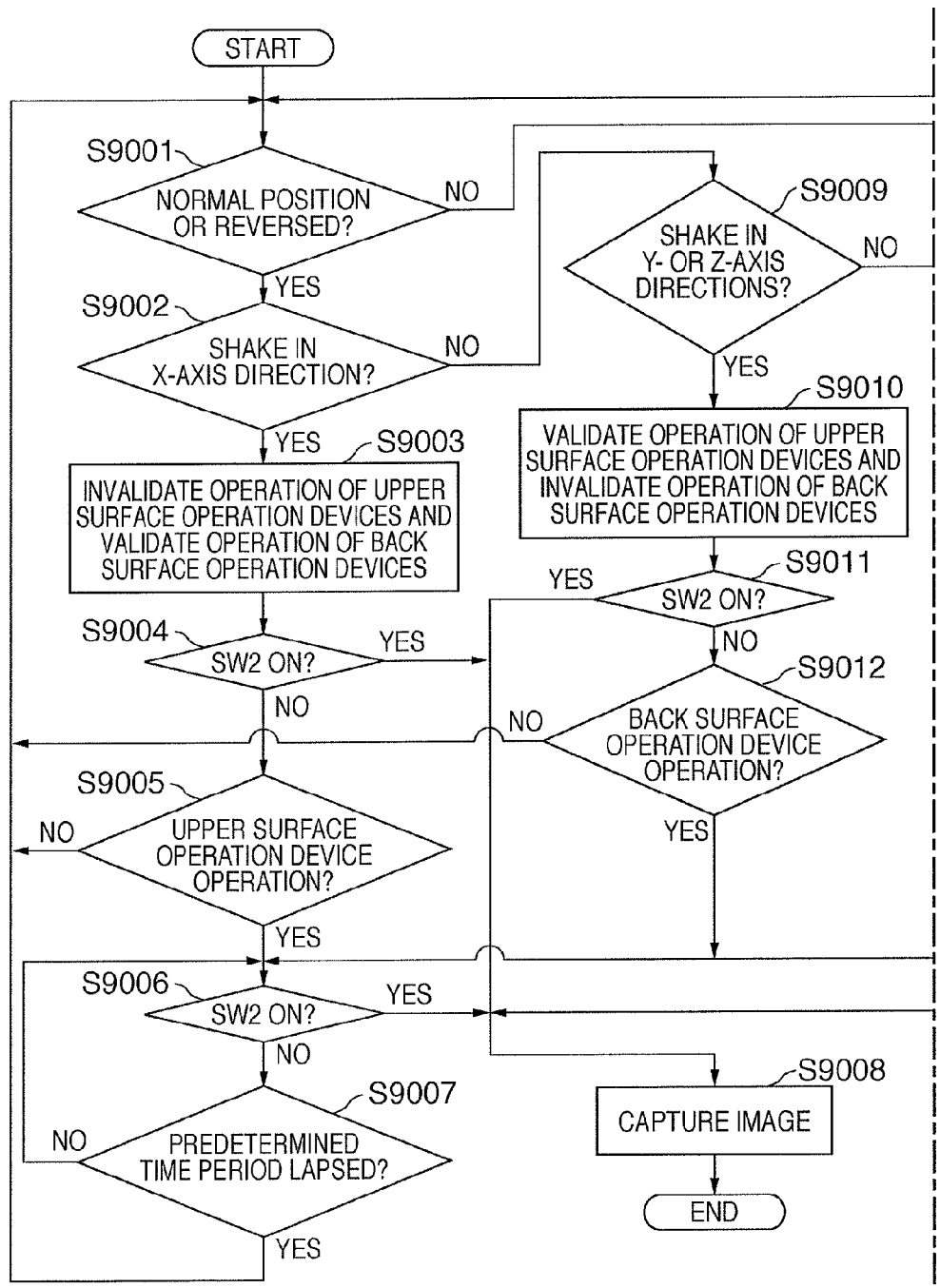
FIG. 8A is a flowchart for explaining outlines of a user operation recognition process in an image capturing mode of a camera according to a third embodiment of the present invention.
Figure 8B:
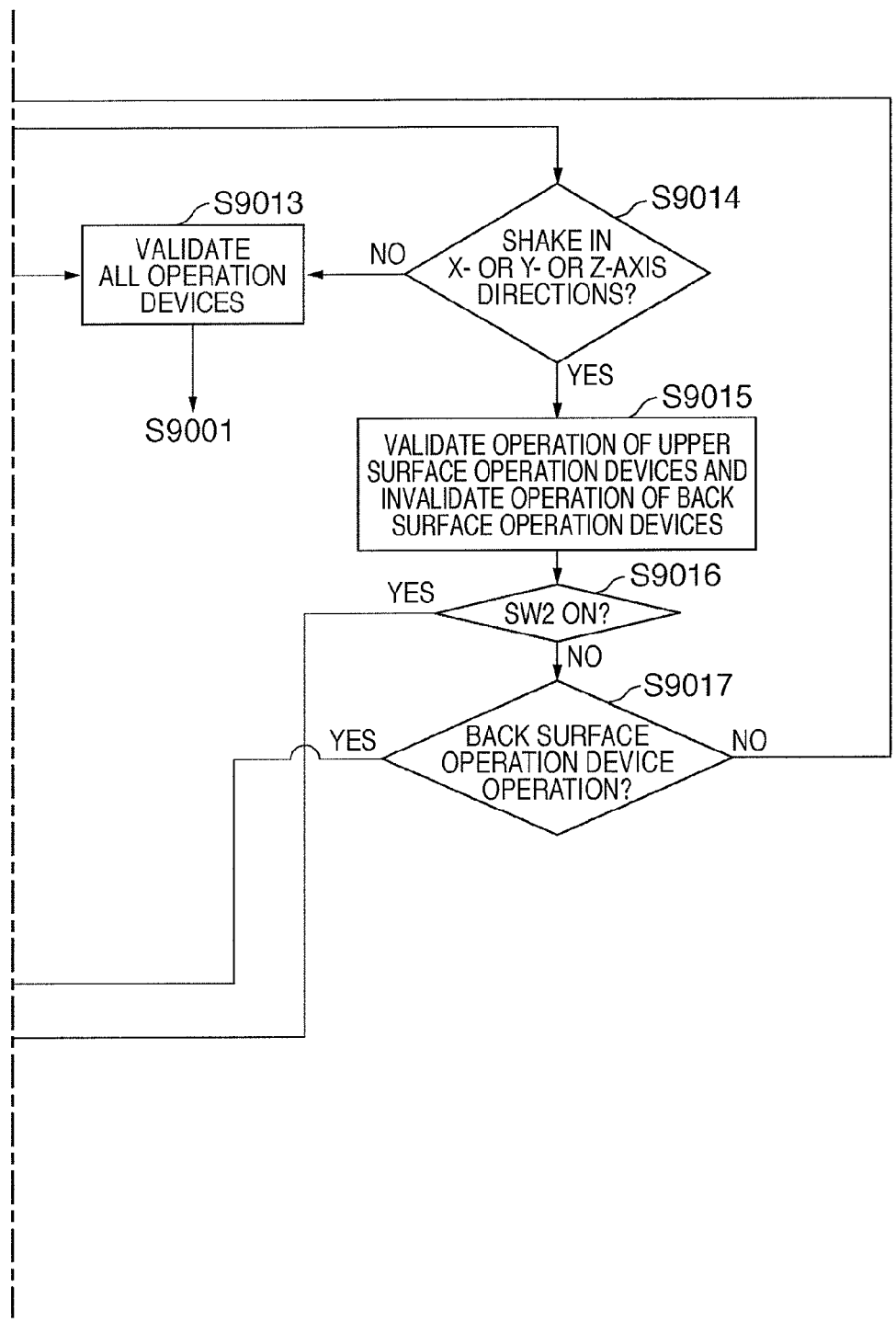
FIG. 8B is a flowchart for explaining outlines of the user operation recognition process in the image capturing mode of the camera according to the third embodiment of the present invention.

FIGS. 8A and 8B are flowcharts for explaining outlines of a user operation recognition process in an image capturing mode of a camera according to the third embodiment of the present invention.

First, the system controller 1014 determines the orientation of the camera from the output of the portrait/landscape position detection sensor 1021 (S9001). At this point, if the camera is at the normal position or the reverse position (a position rotated 180 degrees about the optical axis of the optical system 1001 with respect to the normal position), the shake determination unit 1019 determines whether or not the camera is shaking in the X-axis direction (S9002). If it is determined that camera is shaking in the X-axis direction, then of the operation devices included in the operation unit 1017 the system controller 1014 invalidates operation of those provided on the upper surface of the camera and validates operation of those provided on the back surface of the camera (S9003). This is done because, in a case in which the camera is being shaken in the X-axis direction, there is a strong possibility that the operation devices provided on the upper surface of the camera have been operated accidentally.

Next, the system controller 1014 determines whether or not the second switch of the release button 2001 is ON (S9004), and if it is, carries out an image capturing operation (S9008). If the second switch of the release button 2001 is OFF, the system controller 1014 determines whether or not operation devices on the upper surface of the camera have been operated (S9005). If operation devices on the upper surface of the camera have not been operated, the system controller 1014 returns processing to the camera orientation determination step (S9001).

On the other hand, if operation devices on the upper surface of the camera have been operated, the system controller 1014 determines whether or not the second switch of the release button 2001 is ON (S9006), and if it is, carries out an image capturing operation (S9008). If the second switch of the release button 2001 is OFF, the system controller 1014 determines whether or not a predetermined time has lapsed since operation of the operation devices on the upper surface of the camera was detected in S9005 (S9007). If the predetermined time period has not lapsed, the system controller 1014 continues the determination step of S9006. If the predetermined time has lapsed, the system controller 1014 returns processing to the camera orientation determination step (S9001).

At S9002, in a case in which a determination that the camera is shaking in the X-axis direction has not been obtained, the shake determination unit 1019 determines whether or not the camera is shaking in the Y-axis or Z-axis directions (S9009). If it is determined that the camera is not shaking in either the Y-axis or the Z-axis directions, the system controller 1014 validates operation of all the operation devices included in the operation unit 1017 (S9013) and returns processing to S9001. On the other hand, if it is determined that the camera is shaking in the Y-axis or the Z-axis directions, the system controller 1014 validates operation of the operation devices provided on the upper surface of the camera and invalidates operation of the operation devices provided on the back surface of the camera (S9010). This is done because, in a case in which the camera is being shaken in the Y-axis or the Z-axis directions, there is a strong possibility that the operation devices provided on the back surface of the camera have been operated accidentally.

Next, the system controller 1014 determines whether or not the second switch of the release button 2001 is ON (S9011), and if it is, carries out an image capturing operation (S9008). If the second switch of the release button 2001 is OFF, the system controller 1014 determines if operation devices on the back surface of the camera have been operated (S9012). If operation devices on the back surface of the camera have not been operated, the system controller 1014 returns processing to the camera orientation determination step (S9001).

If operation devices on the back surface of the camera have been operated, the system controller 1014 executes the processes from S9006 onwards described above.

In S9001, in the event that the orientation of the camera is other than the normal position or the reversed position, then it is likely that the camera orientation is such that the camera grip is at the top or at the bottom (typically, positions rotated 90 degrees or −90 degrees about the optical axis of the lens from the normal position). In this case, whether or not the camera is being shaken in one of the X-axis, Y-axis, or Z-axis directions is determined by the shake determination unit 1019 (S9014). If no shake is detected along any of these axes, the system controller 1014 validates operation of all the operation devices included in the operation unit 1017 (S9013) and returns processing to S9001. On the other hand, if shake is detected along any of these axes, the system controller 1014 validates operation of the operation devices provided on the upper surface of the camera and invalidates operation of the operation devices provided on the back surface of the camera (S9015). This is done because, in a case in which the camera orientation is such that the camera grip is that the top or at the bottom, if the camera is being shaken in any one of these directions, there is a strong possibility that the operation devices provided on the back surface of the camera have been operated accidentally.

Thereafter, at S9016 and S9017, the system controller 1014 carries out the same processes as those in S9011 and S9012.

Thus, as described above, in the present embodiment, validation/invalidation of operation of the operation devices provided on the upper surface of the camera and operation of the operation devices provided on the back surface of the camera is carried out separately depending on the orientation of the camera and the direction of shake of the camera. As a result, in addition to the effect the first embodiment, it becomes possible to carry out fine control, distinguishing between operation devices susceptible to accidental operation and operation devices not susceptible to accidental operation.

It is to be noted that in the present embodiment also, as in the first embodiment, in a case in which shaking in the X-axis, Y-axis, or Z-axis directions is detected in S9002 and S9009, the system controller 1014 may recognize it as an instruction or a command correlated in advance with the direction of the shaking (or a combination thereof). Then, the system controller 1014 executes an operation corresponding to the recognized instruction or command.

(Modification of Third Embodiment)

As a modification of the third embodiment, a mode in which the second and third embodiments are combined is also available in the reproduction mode. That is, a method of invalidating operation by the operation device of the camera in accordance with the orientation and waving direction, as in the third embodiment, is available. In this case, the time in which a waving operation is detected is determined as the invalidation time. That is, it is determined that a waving operation is started when the acceleration signal output falls outside a predetermined threshold range (for example, the range of the thresholds ±A or less in FIG. 5A), and it is determined that the titling operation is stopped when a state in which the acceleration signal output falls within the predetermined threshold range continues for a predetermined time (for example, the threshold E in FIG. 5A) or more. In this case, determination in S701 of FIG. 7 is performed for each axial direction (S9002 and S9009 in FIG. 8A and S9014 in FIG. 8B), and a process of invalidating the operation unit in S702 of FIG. 7 is performed in accordance with the surface (S9003 and S9010 in FIG. 8A and S9015 in FIG. 8B).

(Other Embodiments)

In the first and the third embodiments described above, of the operations of the operation devices, an operation corresponding to an instruction to commence image capture (full stroke of the release button 2001) is one that is not invalidated. However, an operation corresponding to an instruction to commence image capture may also be rendered invalid. In this case, in S8005 of the first embodiment, operation of all the operation devices is invalidated, and in S9003 of the third embodiment, operation of the operation devices provided on the upper surface of the camera, including the full stroke of the release button 2001, is invalidated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Furthermore, the present invention is not limited to an imaging apparatus. More specifically, each of the above-described exemplary embodiments of the present invention can be implemented on an electronic apparatus and a communication apparatus.

This application claims the benefit of Japanese Patent Application No. 2009-030469, filed on Feb. 12, 2009, No. 2009-034027, filed on Feb. 17, 2009, and No. 2010-027001, filed on Feb. 9, 2010, which are hereby incorporated by reference herein in their entirety.

What is claimed is:

1. An electronic apparatus comprising:
a first operation unit, which is provided on a housing of the electronic apparatus, configured to enable a user to input an instruction to the electronic apparatus;
a shake detection unit that detects a shake of the electronic apparatus; and
a controller that invalidates an operation of the first operation unit based on a direction of the shake detected by the shake detection unit, wherein the controller invalidates an operation of the first operation unit if the direction of the detected shake is a first direction and does not invalidate an operation of the first operation unit if the direction of the detected shake is a second direction.

2. The electronic apparatus according to claim 1, further comprising:
   a second operation unit, which is provided on the housing of the electronic apparatus, configured to enable a user to input an instruction to the electronic apparatus,
   wherein, if the direction of the detected shake is the first direction, the controller invalidates an operation of the first operation unit without invalidating an operation of the second operation unit.

3. The electronic apparatus according to claim 2, wherein, if the direction of the detected shake is the second direction, the controller invalidates an operation of the second operation unit without invalidating an operation of the first operation unit.

4. The electronic apparatus according to claim 1, further comprising:
   a third operation unit, which is provided on the housing of the electronic apparatus, configured to enable a user to input an instruction to the electronic apparatus,
   wherein, if the direction of the detected shake is the first direction, the controller invalidates an operation of the first operation unit without invalidating a predetermined operation of the third operation unit, and
   wherein, if the direction of the detected shake is the second direction, the controller does not invalidate an operation of the first operation unit and an operation of the third operation unit.

5. The electronic apparatus according to claim 4, further comprising:
   an image capture unit,
   wherein the third operation unit is to input an instruction regarding image capturing using the image capture unit.

6. The electronic apparatus according to claim 5, wherein, if the direction of the detected shake is the first direction, the controller invalidates an operation of the third operation unit to input an instruction to commence image capturing preparation operations without invalidating an operation of the third operation unit to input an instruction to commence image capturing operations.

7. The electronic apparatus according to claim 1,
   wherein the shake detection unit detects and outputs an acceleration component of a shake of the electronic apparatus, and
   the electronic apparatus further comprising a direction determination unit that determines a direction of a shake applied to the electronic apparatus based on the output of the shake detection unit.

8. The electronic apparatus according to claim 7,
   wherein the shake detection unit is an acceleration sensor capable of detecting accelerations in directions along with three-axes of a coordinate system, and
   wherein the direction determination unit determines the direction of a shake applied to the electronic apparatus based on signs of outputs of the acceleration sensor and whether or not an absolute value of the output of the shake detection unit exceeds a first threshold.

9. The electronic apparatus according to claim 2,
   wherein the first operation unit and the second operation unit are provided on different outer surfaces of the housing of the electronic apparatus.

10. The electronic apparatus according to claim 2, further comprising:
    an orientation determination unit that determines an orientation of the electronic apparatus,
    wherein the controller invalidates at least one of the first operation unit and the second operation unit based on the orientation of the electronic apparatus detected by the orientation determination unit and the direction of the detected shake.

11. The electronic apparatus according to claim 4, further comprising:
    an orientation determination unit that determines an orientation of the electronic apparatus,
    wherein the controller invalidates at least one of the first operation unit and the third operation unit based on the orientation of the electronic apparatus detected by the orientation determination unit and the direction of the detected shake.

12. A control method for an electronic apparatus having a first operation unit, which is provided on a housing of the electronic apparatus, to enable a user to input an instruction to the electronic apparatus, the control method comprising:
    a shake detection step of detecting a shake of the electronic apparatus; and
    a control step of invalidating an operation of the first operation unit based on a direction of the shake detected in the shake detection step,
    wherein the control step invalidates an operation of the first operation unit if the direction of the detected shake is a first direction and does not invalidate an operation of the first operation unit if the direction of the detected shake is a second direction.

13. A non-transitory computer-readable recording medium in which computer program that causes a computer to execute the control method according to claim 12.

* * * * *